United States Patent [19]

Tsujimoto

[11] Patent Number: 5,425,059

[45] Date of Patent: Jun. 13, 1995

[54] ADAPTIVE RECEIVING APPARATUS FOR DIGITAL COMMUNICATION SYSTEM

[75] Inventor: Ichiro Tsujimoto, Tokyo, Japan

[73] Assignee: NEC Corporation, Tokyo, Japan

[21] Appl. No.: 99,166

[22] Filed: Jul. 29, 1993

[30] Foreign Application Priority Data

Jul. 31, 1992 [JP] Japan .................................. 4-204635

[51] Int. Cl.[6] ............................................ H04L 1/02
[52] U.S. Cl. .................................... 375/347; 455/137
[58] Field of Search ................... 375/100, 40, 99, 101, 375/102; 455/137, 138, 139, 132–136, 272, 273, 296, 303

[56] References Cited

U.S. PATENT DOCUMENTS

| | | | |
|---|---|---|---|
| 4,281,411 | 7/1981 | Bonn et al. | 455/137 |
| 4,733,402 | 3/1988 | Monsen | 375/100 |
| 5,235,621 | 8/1993 | Amir-Alikhani | 375/100 |

OTHER PUBLICATIONS

Clark, Martin V., et al (1990), "MMSE Diversity Combining for Wideband Digital Cellular Radio", IEEE Global Telecommunications Conference & Exhibition, Conference Record, Communications: Connecting the Future, San Diego, Calif., Dec. 2–5, 1990, vol. 1 of 3, pp. 495–499.

*Primary Examiner*—Stephen Chin
*Assistant Examiner*—Hai H. Phan
*Attorney, Agent, or Firm*—Ostrolenk, Faber, Gerb & Soffen

[57] ABSTRACT

An adaptive receiving apparatus capable of realizing maximization of SN ratio while making multi-path signals coincident is provided. The apparatus comprises a plurality of antenna elements, a plurality of array arrangements each receiving a plurality of received signals from the plurality of antenna elements for producing an adaptive arrayed signal, a combiner for combining a plurality of adaptive arrayed signals form the plurality of array arrangements, an adaptive equalizer receiving a combined signal from the combiner for producing a decision data signal and adaptive array control means responsive to the plurality of received signals and the decision data signal for controlling the plurality of array arrangements.

2 Claims, 3 Drawing Sheets

ADAPTIVE RECEIVING APPARATUS FOR DIGITAL COMMUNICATION SYSTEM

BACKGROUND OF THE INVENTION

The present invention relates to an adaptive receiving apparatus for a digital communication system and, more particularly, to an adaptive receiving apparatus for land and satellite digital mobile communication systems, which is capable of performing an optimum reception under multi-path fading and low SN ratio conditions.

In a land digital mobile communication system or a satellite digital communication system using BPSK, QPSK or QAM modulation, it is generally necessary to perform an adaptive equalization for multi-path fading distortion in a receiving apparatus. Further, in the case of a mobile communication system in a city area, multi-path distortion due to such factors as reflection off buildings becomes also a subject to be equalized. For the multi-path fading distortion, it has been reported that an adaptive array is effective. For example, Clark, et al. propose utilization of an adaptive array to a land mobile communication as disclosed in "MMSE (Minimum Mean Square Error) Diversity Combining for Wideband Digital Cellular Radio", No. 404.5.1, IEEE Global Telecommunication Conference, 1990. According to this article, it is possible to form a null of an antenna pattern in an incident direction of multi-path waves. By applying such null, a multi-path wave is not received and only main wave is received and, thus, no multi-path distortion occurs. Therefore, it is ideally possible to equivalently remove intersymbol interference due to a multi-path wave by using only an adaptive array, without using a conventional adaptive equalizer having a transversal filter structure.

FIG. 1 shows a typical conventional receiving apparatus having an adaptive array which is disclosed in the above-mentioned article. In FIG. 1, 301 depicts N antennas, 302 N receivers, 303 N multipliers, 304 an adder, 305 a decision device, 306 a subtracter and 307 a LMS (Least Mean Square) operator. The construction shown in FIG. 1 is a well known adaptive array. In order to perform an adaptive control of tap coefficients in the adaptive array, an error signal, which is a difference between an output of the adder 304 and a reference signal, is produced first. As the reference signal, a known training signal or a decision data, which is an output of the decision device 305, is used. The LMS operator 307 updates the tap coefficients of the multipliers 303 by the complex LMS algorithm proposed by Widrow such that mean square value of the error signal becomes minimum. Therefore, the adaptive array shown in FIG. 1 is referred to as an LMS adaptive array and it is known that it operates as follows.

In case where there is no multi-path propagation, the adaptive array makes the antenna pattern to an incident direction of a desired wave so that a receiving signal level becomes maximum. On the other hand, in a case where there is multi-path propagation, a multi-path wave which is in advance or delayed with respect to a main wave (desired wave) become interference. In this case, the adaptive array makes an antenna directivity to the main wave and makes a null in the direction of the multi-path wave propagation. Therefore, it is interpreted that the article of Clark et al. mentioned above utilizes such properties sufficiently. CMA algorithm is also well known as well as LMS algorithm and is being studied. This is to control an envelope level of an output of the adder 304 to a constant level and removes a multi-path wave by means of an adaptive array ultimately.

In the conventional receiving apparatus mentioned above, the multi-path distortion is removed by forming null on an antenna pattern in the direction of the multi-path wave. In such case, when a delay profile due to multi-path propagation is further dispersed, the main wave level is considerably lowered. That is, in the adaptive array method for receiving only the main wave, SN ratio is inherently degraded according to the degree of multi-path dispersion. Therefore, the conventional receiving apparatus using a adaptive array has a drawback that it is impossible to realize an optimum reception in a condition where transmitted power is limited and multi-path propagation arises. Particularly, in a satellite mobile communication system which inherently has low SN ratio condition, a multi-path removing technique capable of improving SN ratio has been required.

SUMMARY OF THE INVENTION

An object of the present invention is to provide an adaptive receiving apparatus using an adaptive array, which is capable of equivalently realizing both maximization of SN ratio and multi-path wave removal.

An adaptive receiving apparatus according to the present invention comprises receiver means including an array antenna composed of N antenna elements (N is an integer larger than 1) for delivering N received signals; branching means for branching the received N signals into M branches (M is an integer larger than 1), respectively; M adaptive array arrangements each for receiving the received N signals on each of the M branches branched by the branching means and for delivering M adaptive arrayed signals Sai (i=1, 2, ..., M), the adaptive array arrangement including N delay circuits each for delaying the received signals to produce a delayed signal, N correlators each for seeking correlation between the delayed signal and a reference signal, N multipliers each for multiplying the received signal and coefficients associated with the correlation signal and an adder for adding N outputs of the N multipliers to produce the adaptive arrayed signal; first delaying means for delaying the M adaptive arrayed signals SAi by $\tau \cdot (M-i)$ (i=1, 2, ... M), respectively, to deliver M delayed-adaptive arrayed signals SDi (i=1, 2, ... M); combining means for combining the M delayed adaptive arrayed signals SDi; adaptive equalizer means for equalizing the output of the combining means to deliver decision data; and second delaying means for delaying the decision data by $\tau \cdot (i-1)$ (i=1, 2, ... M) to deliver M delayed decision data, each of the M delayed decision data being applied as the reference signal in each of the M adaptive array arrangements.

BRIEF DESCRIPTION OF THE DRAWINGS

Other objectives and benefits of the present invention will be made clear by the detailed description which follows and by the accompanying drawings in which.

DETAILED DESCRIPTION OF THE PREFERRED EMBODIMENT

Figure 2:
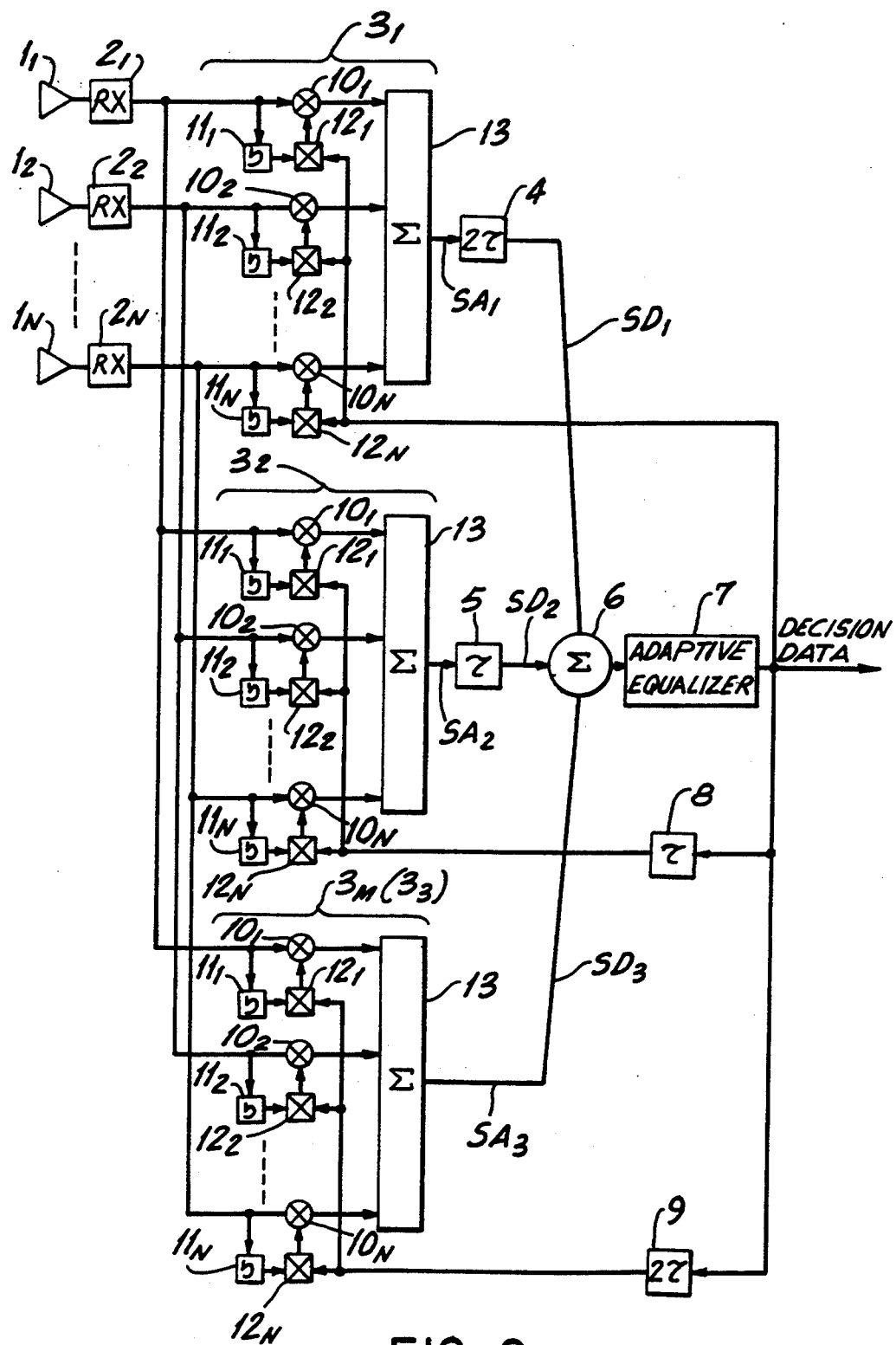
FIG. 2 is a block diagram of an embodiment according to the present invention.

With reference to FIG. 2, an embodiment of the present invention comprises N antennas $1_1 \sim 1_N$, N receivers $2_1 \sim 2_N$, M adaptive array arrangements $3_1 \sim 3_M$, a delay element 4 having a delay time $2\tau$, a delay element 5 having a delay time $\tau$, a combiner 6, an adaptive equalizer 7, a delay element 8 having a delay time $\tau$ and a delay element 9 having a delay time $2\tau$. Each adaptive array arrangement includes N multipliers $10_1 \sim 10_N$, N delay circuits $11_1 \sim 11_N$, N correlators $12_1 \sim 12_N$ and an adder 13. The delay time $\tau$ is set to a data interval T in the usual case, or set to T/2 in a special case. In FIG. 2, combination of the N antennas $1_1 \sim 1_N$ and the N receivers $2_1 \sim 2_N$ operates as N-element array antenna and each receiver receives a radio frequency signal and outputs a received signal. The received signal is an intermediate frequency signal or a baseband signal. The N received signals from the N receivers $2_1 \sim 2_N$ are branched into three sets and supplied to three independent adaptive array arrangements $3_1 \sim 3_M$ (M=3 in this embodiment).

Figure 1:
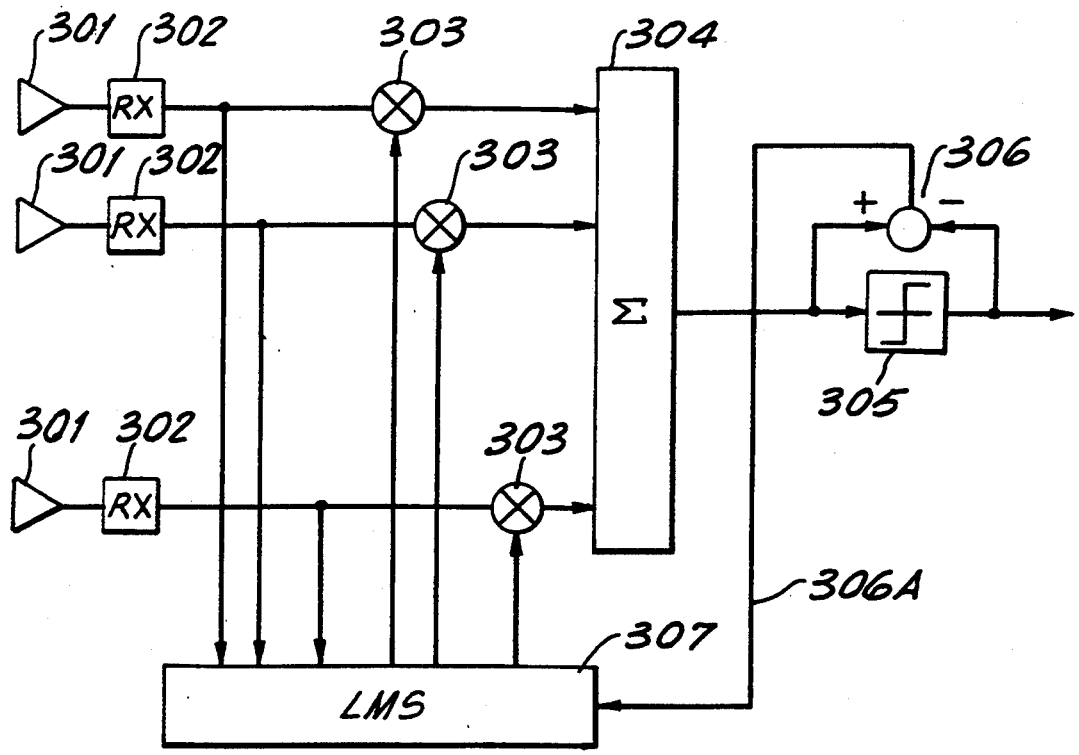
FIG. 1 is a block diagram of a conventional adaptive receiving apparatus.

The feature of the present invention is, instead of forming a null against a multi-path wave, to rake up multi-path waves into a desired signal wave for maximum SN ratio. In maximum ratio combining, propagation delay times of the respective multi-path waves are absorbed and an effect similar to that obtained by a matched filter well known in the communication theory is realized by the adaptive array arrangement. Through SN ratio is maximized by the matched filtering, the non-distortion condition known as Nyquist criterion in a digital transmission is not satisfied. Therefore, the adaptive equalizer 7 shown in FIG. 2 is indispensable. The adaptive equalizer generally includes an adaptive filter and classified into a linear equalizer and a non-linear equalizer, etc., each of which is equipped with the decision device 305 and the subtracter 306 shown in FIG. 1. That is, the adaptive equalizer is controlled such that a mean square value of an error signal from a decision circuit becomes minimum. A decision feedback equalizer (DFE) is applied as the adaptive equalizer 7.

In the invention, it is noted that a control equivalent to the conventional MMSE control of the adaptive array is performed within the adaptive equalizer 7 in FIG. 2. As mentioned above, in order not to form the null for the multi-path waves by means of the adaptive arrays, the adaptive array arrangement is adaptive-controlled by using decision data which is an output of the adaptive equalizer 7, instead of the error signal of the decision circuit. That is, in FIG. 2, in order to control the first adaptive array arrangement $3_1$, the decision data from the adaptive equalizer 7 and the N received signals from the delay circuit $11_1 \sim 11_N$ are correlated in the N correlators $12_1 \sim 12_N$ and the correlation results are multiplied with the input N received signals by the multipliers $10_1 \sim 10_N$, respectively. In this correlation processing, the input received signals are delayed by $\eta$ by means of the delay circuit 11 and the delay time $\eta$ is set to a sum of the delay time $\tau$ of the delay element 5 and a delay time in the adaptive equalizer 7 The reason for using the delay circuit 11 is that the decision data delivered from the adaptive equalizer 7 is delayed by $\eta$ from the received signal and so it is necessary to match the timing during the correlation processing.

Then, the operation of detecting a specific multi-path wave from a plurality of multi-path waves by means of the correlation processing in the adaptive array arrangement will be described with reference to FIG. 3.

Figure 3:
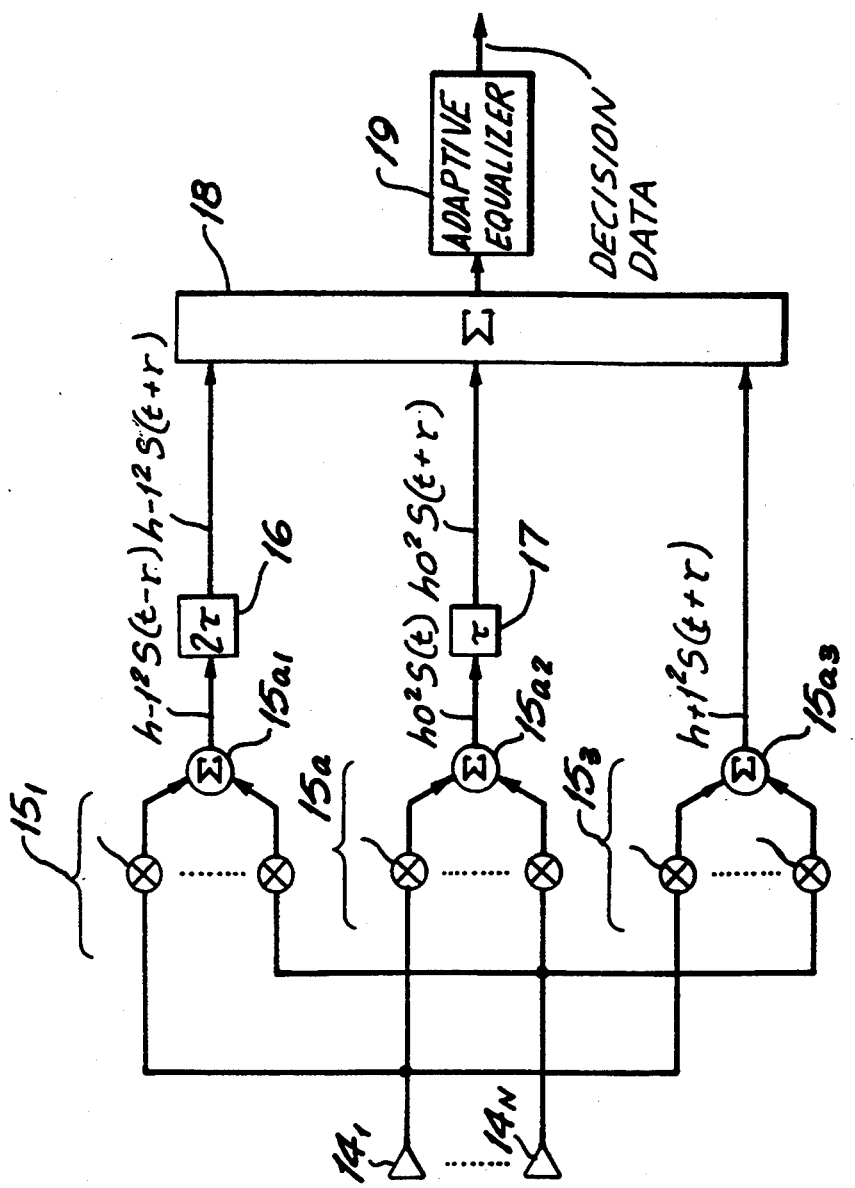
FIG. 3 is a schematic diagram explaining the principle of the present invention.

FIG. 3 shows a schematic diagram for explaining the principle of the present invention. This figure comprises antenna elements $14_1 \sim 14_N$, adaptive array arrangement $15_1 \sim 15_3$, delay elements 16, 17 having delay times $2\tau$ and $\tau$, respectively, a combiner 18 and an adaptive equalizer 19. Further, it is assumed that a main wave $h_0S(t)$, an advanced wave $h_{-1}S(t-\tau)$ and a delayed wave $h_{+1}S(t+\tau)$ lie along directions shown by arrows, respectively, where $h_{-1}$, $h_0$ and $h_{+1}$ are complex transmission coefficients for the respective multi-paths and coincident with discrete values of impulse response. In this case, a receiving signal r(t) at the antenna element 14 is expressed by the equation (1)

$$r(t) = h_0 S(t) + h_{-1} S(t-\tau) + h_{+1} S(t+\tau) \tag{1}$$

where S(t) is a transmission data signal. In an array antenna arrangement, respective antenna elements are usually arranged with an interval of a half-wave length and therefore there is a constant phase difference between signals received by adjacent antenna elements. That is, the signal received by the second antenna element 14 is $r(t)\cdot\exp(j\phi)$, the signal received by the third antenna element 14 is $r(t)\cdot\exp(j2\phi)$ and similarly the signal received by the Nth antenna element 14 becomes $r(t)\cdot\exp\{j(N-1)\phi\}$. It is assumed that the decision data of the adaptive equalizer 19 is $Sa(t+\tau)$. In a case where there is no decision error, the decision data coincides with the transmission data and, in a case where error rate is low, it can be approximated by the equation (2).

$$Sa(t+\tau) \approx S(t+\tau) \tag{2}$$

Therefore, the decision data will be represented by S(t) hereinafter.

In FIG. 2, the second adaptive array arrangement $3_2$ will be considered first. The second adaptive array arrangement utilizes the decision data from the delay element 8, which delays the decision data from the adaptive equalizer 8 by $\tau$, for the correlation control. In this case, correlation between the decision data Sa(t) from the delay element 8 and the received signals are calculated in the N correlators $12_1 \sim 12_N$ and correlation values V1 represented by the equation (3) are output thereby, respectively. The term "correlation" here is the time mean of a product of a reference signal and a complex conjugate of a signal against the reference signal, and the time mean is represented by E. In the second adaptive array arrangement, the output =V1 of the first correlator $12_1$ is represented by the equation (3).

$$\begin{aligned} V1 &= E[r(t)^* \cdot S(t)] \\ &= E[\{h_0 S(t) + h_{-1} S(t-\tau) + h_{+1} S(t+\tau)\}^* \cdot S(t)] \\ &= h_0^* E[S(t)^* \cdot S(t)] + h_{-1}^* E[S(t-\tau)^* \cdot S(t)] + \\ &\quad h_{+1}^* E[S(t+\tau)^* \cdot S(t)] \end{aligned} \tag{3}$$

where * indicates complex conjugate. The digital data signal S(t) has autocorrelation which is usually sharp and becomes zero when time difference is more than the data interval T, as exemplified by a PN signal. That is, $$[S(t)^* \cdot S(t)] = 1$$

$$E[S(t-\tau)^* \cdot S(t)] = 0$$

$$E[S(t+\tau)^* \cdot S(t)] = 0$$

and the equation (3) is represented by the equation (4).

$$V_1 = h_0^* \tag{4}$$

Similarly, the output $=V_2$ of the second correlator $12_2$ in the second adaptive array is represented by the equation (5).

$$\begin{aligned}
V_2 &= E[r(t)^* \exp(-j\phi) S(t)] \\
&= E[\{h_0 S(t) + h_{-1} S(t - \tau) h_{+1} S(t + \tau)\}^* \\
&\quad \exp(-j\phi) \cdot S(t)] \\
&= h_0^* \exp(-j\phi) E[S(t)^* \cdot S(t)] + \\
&\quad h_{-1}^* \exp(-j\phi) E[S(t - \tau)^* \cdot S(t)] + \\
&\quad h_{+1}^* \exp(-j\phi) E[S(t + \tau)^* \cdot S(t)] \\
&= h_0^* \exp(-j\phi)
\end{aligned} \tag{5}$$

Similarly, the output $=V_N$ of the Nth correlator $12_N$ of the second adaptive array arrangement is represented by the equation (6).

$$V_N = h_0^* \exp\{-j(N-1)\phi\} \tag{6}$$

Therefore, the vector representation of the tap coefficients to be multiplied in the N multipliers $10_1 \sim 10_N$ in the second adaptive array arrangement is according to the equation (7).

$$W_2 = \begin{pmatrix} h_0^* \\ h_0^* \exp(-j\phi) \\ \cdot \\ \cdot \\ \cdot \\ h_0^* \exp\{-j(N-1)\phi\} \end{pmatrix} \tag{7}$$

where, W2 represents the vector defined by $V_1, V_2, \ldots, V_N$.

The tap coefficients correspond to the theoretical solution of tap coefficients of a conventional adaptive array arrangement when the antenna directivity of the second adaptive array arrangement shown in FIG. 3 is in the incident direction of the main wave $h_0 S(t)$. The vector representation of the input signals of the respective multipliers of the second adaptive array arrangement is shown by the equation (8).

$$R^T = [r(t) r(t) \exp(-j\phi) \ldots r(t) \exp\{j(M-1)\phi\}] \tag{8}$$

where T of $R^T$ is transposition of vector. Accordingly, the output of the second array arrangement becomes the equation (9).

$$\begin{aligned}
R^T W_2 &= N \cdot h_0^* \cdot r(t) \\
&= N \cdot \{h_0^* h_0 S(t) + h_0^* h_{-1} S(t - \tau) + \\
&\quad h_0^* h_{+1} S(t + \tau)\}
\end{aligned} \tag{9}$$

where, $h_0^* h_0$ in the first term of the right side of the equation (9) is a product of complex conjugates and always a real number having value of $h_0^2$ regardless of variation of transmission coefficients due to fading. On the other hand, $h_0^* h_{-1}$ and $h_0^* h_{+1}$ of the second and third terms are always vary as vectors since they are not in the complex conjugate relation and have no correlation. That is, as the equation (9), it is equivalent to the maximum ratio combining of the N branches with respect to S(t). Accordingly, the output of the second array arrangement is approximated by the equation (10).

$$R^T W_2 \approx N \cdot h_0 S(t) \tag{10}$$

Therefore, the output of the adder $15a2$ in FIG. 3 is represented by the equation (10). However, in this figure, it is shown by normalizing by N.

Next, the correlation control of the first adaptive array arrangement $3_1$ will be described. As shown in FIG. 2, for the control of this array arrangement, the decision data from the adaptive equalizer 7 is used for correlation processing without delay. Although the reference signal for correlation processing of the second array arrangement $3_2$ is S(t) as described above, $S(t-\tau)$ becomes the reference signal in this arrangement $3_1$. Therefore, the tap coefficients are represented by the equation (11) according to a similar calculation.

$$W_1 = \begin{pmatrix} h_{-1}^* \\ h_{-1}^* \exp(-j\phi) \\ \cdot \\ \cdot \\ \cdot \\ h_{-1}^* \exp\{-j(N-1)\phi\} \end{pmatrix} \tag{11}$$

Since the input vector of the multipliers $10_1 \sim 10_N$ of the first array arrangement is the same as represented by the equation (8), the output of this arrangement is represented by the equation (12).

$$\begin{aligned}
R^T W_1 &= N \cdot h_{-1}^* \cdot r(t) \\
&= N \cdot \{h_{-1}^* h_0 S(t) + h_{-1}^* h_{-1} S(t - \tau) + \\
&\quad h_{-1}^* h_{+1} S(t + \tau)\} \\
&= N \cdot h_{-1}^2 S(t - \tau)
\end{aligned} \tag{12}$$

Therefore, by normalizing by N, $h_{-1}{}^2 S(t-\tau)$ is outputted from the adder $15a1$ in the first array arrangement (FIG. 3). Similarly, for the third array arrangement, $h_{+1}{}^2 S(t+\tau)$ is outputted from the adder $15a3$ (FIG. 3).

Figure 4A:
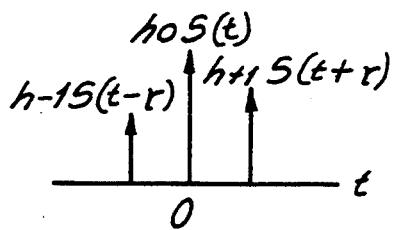
FIGS. 4(a) and 4(b) are diagrams showing time-relationships between a desired wave and multi-path waves, before and after processing, respectively.
Figure 4B:
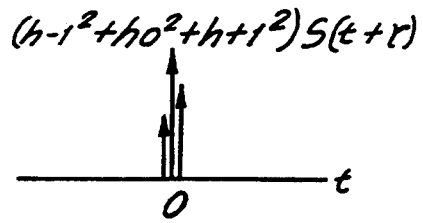

In FIG. 2 (FIG. 3), between the outputs of the respective adaptive array arrangement, there is the difference $\tau$ in delay time. In the embodiment, this delay time difference $\tau$ is absorbed by providing the delay elements 4 and 5 (in FIG. 2, the delay elements 16 and 17). That is, three waves dispersed in delay shown in FIG. 4(a) are matched in time at identical time as shown in FIG.

4(b) and $(h_{-1}^2+h_0^2+h_{+1}^2) \cdot S(t+\tau)$ is obtained from the combiner 6 (in FIG. 3, the combiner 18). This operation is equivalent to raking up a channel impulse response by matched filtering and realizes maximization of SN ratio by maximal ratio combining of signal powers dispersed as shown in FIG. 4(a) at the reference time. Wave distortion related to the signal is ultimately removed by the adaptive equalizer 7 (in FIGS. 3, 19).

As mentioned above, maximization of SN ratio is performed by utilizing multi-path waves having delay times different mutually by data interval $\tau$ into the desired signal, rather than removing them. To this end, a plurality of mutually independent adaptive array arrangements are applied from an array antenna reception; the multi-path waves are extracted by means of the respective adaptive array arrangements; propagation delay difference thereof is cancelled by the delay elements; and the processed multi-path waves are combined at maximum ratio. Therefore, the present invention is advantageously applied to a low SN mobile satellite communication system and a land mobile communication system.

According to the present invention, multi-path waves are also utilized as the desired signal wave by realizing the spatial processing by means of the adaptive array arrangement, which equivalently operates as the matched filtering. Thus, the SN ratio is maximized and, thus, communication system under low SN ratio condition and multi-path environment becomes realizable.

What is claimed is:

1. An adaptive receiving apparatus comprising:
   a plurality of antenna elements for receiving respective incident signals to produce a plurality of received signals;
   a plurality of adaptive array arrangements each for receiving said plurality of received signals and each for adding the plurality of received signals to produce an adaptive-arrayed signal;
   delay means coupled to said plurality of adaptive array arrangements for cancelling a delay-time difference between a plurality of adaptive-arrayed signals delivered from said plurality of adaptive array arrangements to produce a plurality of time-compensated signals;
   combining means for combining said time-compensated signals to produce a combined signal;
   adaptive equalizing means receiving said combined signal to produce a decision data signal; and
   adaptive array control means responsive to said plurality of received signals and said decision data signal for controlling said plurality of adaptive array arrangements such that said combined signal delivered from said combining means has an optimal S/N ratio, said adaptive array control means including:
   second delay means receiving and decision data signal for producing a plurality of time-compensated decision data signals having a predetermined time difference therebetween, said plurality of time-compensated decision data signals being associated with said plurality of adaptive array arrangements, respectively, delay circuits coupled to each said adaptive array arrangement for delaying said received signals to produce delayed-received signals, and correlator means coupled to each said adaptive array arrangement for calculating correlation between each of said delayed-received signals and a corresponding time-compensated decision data signal to produce coefficients; and each said adaptive array arrangement including multiplier means for multiplying said received signals and corresponding coefficients to produced weighted signals, and adding means for adding said weighted signals to produce said adaptive-arrayed signal.

2. An adaptive receiving apparatus comprising:
   receiver means including an array antenna comprising N antenna elements, where N is an integer larger than 1, for delivering N received signals;
   branching means for branching each of the received N signals into M branches, where M is an integer larger than 1;
   M adaptive array arrangements each for receiving the received N signals on each of the M branches branched by the branching means, said M adaptive array arrangements producing M adaptive arrayed signals SAi (i=1, 2, ..., M) each adaptive array arrangement including N delay circuits each for delaying a corresponding received signal to produce a delayed signal, N correlators each for calculating correlation between the delayed signal and a reference signal, N multipliers each for multiplying the received signal and coefficients associated with the correlation and an adder for adding N outputs of the N multipliers to produce the adaptive arrayed signal;
   first delaying means for delaying the M−1 adaptive arrayed signals SDi by $\tau \cdot (M-1)$ ($\tau$: data interval, i=1, 2, ..., (M−1)), respectively, to deliver (M−1) delayed-adaptive arrayed signals SDi (i=1, 2, ..., (M−1));
   combining means for combining the (M−1) delayed-adaptive arrayed signals SDi and the adaptive arrayed signal SAM;
   adaptive equalizer means for equalizing the output of the combining means to deliver decision data; and
   second delaying means for delaying the decision data by $\tau \cdot (i-1)$ (i=1, 2, ..., (M−1)) to deliver (M−1) delayed decision data, wherein said decision data and the (M−1) delayed decision data are applied as the reference signal in each of the M adaptive array arrangements.

* * * * *